US012802397B2

(12) United States Patent
Ariza et al.

(10) Patent No.: US 12,802,397 B2
(45) Date of Patent: Nov. 17, 2026

(54) DISPLAYS WITH LIGHTENING AND DARKENING EFFECTS

(71) Applicant: Apple Inc., Cupertino, CA (US)

(72) Inventors: Yujin R Ariza, Cupertino, CA (US); Courtland M Idstrom, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 451 days.

(21) Appl. No.: 18/339,089

(22) Filed: Jun. 21, 2023

(65) Prior Publication Data

US 2024/0104888 A1 Mar. 28, 2024

Related U.S. Application Data

(60) Provisional application No. 63/409,092, filed on Sep. 22, 2022.

(51) Int. Cl.

*G06V 10/60* (2022.01)
*G06T 7/50* (2017.01)
*H04N 5/272* (2006.01)

(52) U.S. Cl.

CPC ................ *G06V 10/60* (2022.01); *G06T 7/50* (2017.01); *H04N 5/272* (2013.01)

(58) Field of Classification Search

CPC ........... G06V 10/60; G06T 7/50; G06T 11/00; H04N 5/272
USPC .......................................................... 382/274
See application file for complete search history.

(56) References Cited

U.S. PATENT DOCUMENTS

| | | | | |
|---|---|---|---|---|
| 8,350,868 | B2 | 1/2013 | Chang et al. | |
| 9,639,965 | B2 | 5/2017 | Weiss | |
| 10,257,487 | B1 * | 4/2019 | Tamatam | G06T 1/60 |
| 2011/0002194 | A1 * | 1/2011 | Imhof | G01V 1/32 367/53 |
| 2012/0200587 | A1 * | 8/2012 | Bapst | G09G 5/06 345/589 |

(Continued)

OTHER PUBLICATIONS

Joshua et al., Pre-multiplied alpha, https://en.sfml-dev.org/forums/index.php?topic=5026.0, Jun. 9, 2011, SFML community forums.

(Continued)

*Primary Examiner* — Jennifer Mehmood
*Assistant Examiner* — Dustin Bilodeau
(74) *Attorney, Agent, or Firm* — Treyz Law Group, P.C.; Joseph F. Guihan

(57) ABSTRACT

An electronic device may include a display and a camera. The camera may capture images of a physical environment around the electronic device. The images of the physical environment may sometimes be displayed on the display as a background layer (e.g., for a pass-through video feed). A user interface may be displayed over the pass-through video feed. Operating the display may include rendering one or more layers of one or more user interface elements, with at least one user interface element being encoded with a lightening or darkening effect. The one or more layers of one or more user interface elements may be composited together and subsequently composited with the pass-through video feed. Compositing the user interface composite with the pass-through video feed may cause the encoded lightening or darkening effect to be applied to the pass-through video feed.

21 Claims, 5 Drawing Sheets

(56) References Cited

U.S. PATENT DOCUMENTS

| | | | | |
|---|---|---|---|---|
| 2013/0063445 | A1* | 3/2013 | Blanco | G06T 11/00 345/473 |
| 2016/0328633 | A1* | 11/2016 | Pan | G06T 11/00 |
| 2020/0267441 | A1* | 8/2020 | Schwartz | H04N 21/43074 |

OTHER PUBLICATIONS

Premultiplied alpha, https://shawnhargreaves.com/blog/premultiplied-alpha.html, Nov. 6, 2009, Shawn Hargreaves Blog.

Nightcabbage et al., Pre-Multiplied Alpha, https://forum.unity.com/threads/pre-multiplied-alpha.225412/, Jan. 29, 2014, Unity Forum.

* cited by examiner $$R = min(1, S + D)$$

$$R = 1 - min(1, (1-S) + (1-D))$$

$$R.rgb = S.rgb*S.a + D.rgb*(1-S.a)$$

FIG. 6

$$R.rgb = S.rgb+D.rgb*(1-S.a)$$

FIG. 7

$$R.a = S.a + D.a*(1-S.a)$$

FIG. 8

DISPLAYS WITH LIGHTENING AND DARKENING EFFECTS

This application claims priority to U.S. provisional patent application No. 63/409,092, filed Sep. 22, 2022, which is hereby incorporated by reference herein in its entirety.

BACKGROUND

This relates generally to electronic devices, and, more particularly, to electronic devices with displays.

Electronic devices often include displays. For example, an electronic device may have an organic light-emitting diode (OLED) display based on organic light-emitting diode pixels or a liquid crystal display (LCD) based on liquid crystal display pixels. A user interface may be presented on the display. If care is not taken, the user interface may not have a desired aesthetic appearance or rendering and displaying the user interface may consume more processing power than desired.

SUMMARY

A method of operating a display may include rendering a layer for the display that includes an element that is encoded with a lightening or darkening effect and compositing the rendered layer with at least one additional layer by applying the lightening or darkening effect to the at least one additional layer based on relative depth between the rendered layer and the at least one additional layer.

An electronic device may include a display and control circuitry configured to render a layer for the display that includes an element that is encoded with a lightening or darkening effect and composite the rendered layer with at least one additional layer by applying the lightening or darkening effect to the at least one additional layer based on relative depth between the rendered layer and the at least one additional layer.

A method of operating a display may include rendering a layer for the display that includes an element. The element may be encoded, using an opacity value for the element and color values for the element, with an effect. The method may further include compositing the rendered layer with at least one additional layer by applying the effect to the at least one additional layer based on relative depth between the rendered layer and the at least one additional layer.

BRIEF DESCRIPTION OF THE DRAWINGS

FIG. 6 is a gray level formula for a source-over composite that may be used when compositing a foreground layer and a background layer in accordance with some embodiments.

FIG. 7 is a gray level formula for a premultiplied source-over composite that may be used when compositing a foreground layer and a background layer in accordance with some embodiments.

FIG. 8 is an opacity formula for a source-over composite that may be used when compositing a foreground layer and a background layer in accordance with some embodiments.

DETAILED DESCRIPTION

Figure 1:
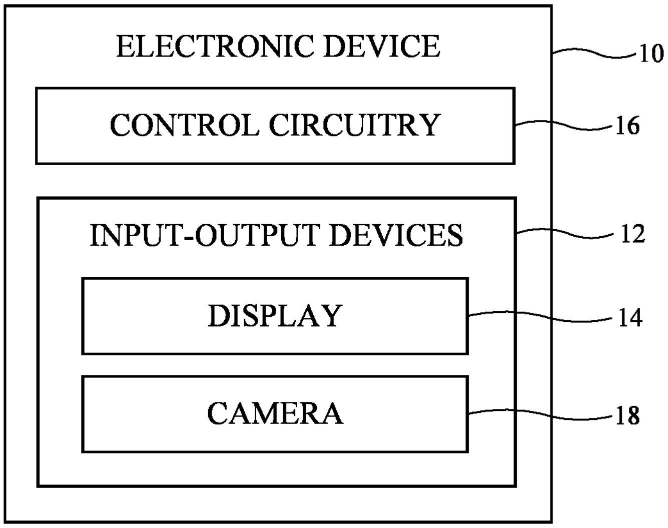
FIG. 1 is a schematic diagram of an illustrative electronic device having a display in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may include control circuitry 16 for supporting the operation of device 10. The control circuitry may include storage such as hard disk drive storage, nonvolatile memory (e.g., flash memory or other electrically-programmable-read-only memory configured to form a solid-state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, keypads, keyboards, microphones, speakers, tone generators, vibrators, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a liquid crystal display, an organic light-emitting diode display, a microLED display, or any other desired type of display. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Input-output devices 12 may include at least one camera 18. The camera may capture images of the physical environment around electronic device. In some cases, the camera may capture pass-through video that is displayed on display 14 in real time. The pass-through video may simulate the physical environment that would be viewable through display 14 if display 14 was transparent or omitted. In this way, the user may perceive the physical environment (including a portion behind the display) without interruption, even when display 14 is blocking some of the physical environment from view.

Control circuitry 16 may be used to run software on device 10 such as operating system code and applications. During operation of device 10, the software running on control circuitry 16 may display images on display 14.

Figures 2, 3, 4:
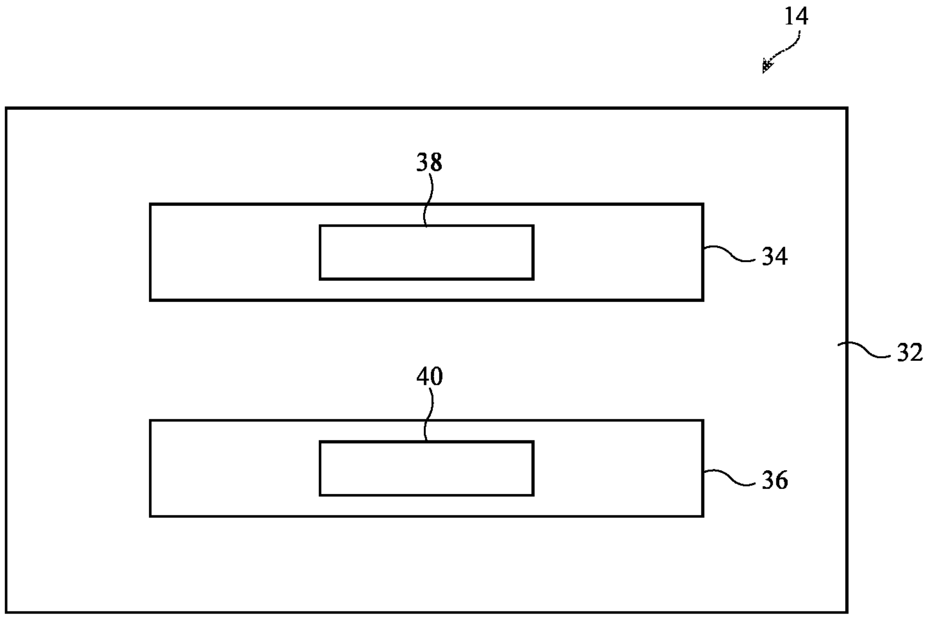
FIG. 2 is a view of an illustrative display with a background and one or more user interface elements in accordance with some embodiments.
FIG. 3 is a formula for applying a lightening effect when compositing a foreground layer and a background layer in accordance with some embodiments.
FIG. 4 is a formula for applying a darkening effect when compositing a foreground layer and a background layer in accordance with some embodiments.

FIG. 2 is a top view of an illustrative display 14. FIG. 2 shows how user interface elements may be displayed on a background. In particular, a first user interface element 34 is displayed on background 32 and a second user interface element 36 is displayed on background 32. The first and second user interface elements 34 and 36 may be, for example, windows that are a part of a user interface for electronic device 10 that is viewable on display 14.

The user interface presented on display 14 may include multiple overlapping user interface elements if desired. As shown in FIG. 2, a third user interface element 38 is displayed over user interface element 34 and a fourth user interface element 40 is displayed over user interface element 36. User interface elements 38 and 40 may each be, for example, text that is displayed over a respective window. In other words, user interface element 38 comprises text that is displayed over window 34 and user interface element 40 comprises text that is displayed over window 36.

To improve the aesthetic appearance of the user interface on display 14, lightening and/or darkening effects may be applied to one or more user interface elements. The lightening and/or darkening effects (sometimes referred to as vibrancy effects) may be used to blend foreground and background colors, which may help foreground content stand out against the background while also hinting at the content residing in the background.

The user interface elements may be composited from back to front using a painter's algorithm. The lightening and/or darkening effects may be applied during this compositing process. Each user interface element on display 14 may be assigned a respective layer. In the example of FIG. 2, the background 32 serves as the bottom-most layer of the composite. User interface elements 34 and 36 are part of a first user interface layer that is the bottom-most user interface layer. User interface elements 38 and 40 are part of a second user interface layer that is positioned over the first user interface layer. Additional user interface layers may be included if desired.

During the compositing process, the color of the foreground (e.g., the higher of the two layers) and the background (e.g., the lower of the two layers) may be blended. A lightening or darkening effect may be applied when blending the two layers.

FIG. 3 is a formula for a lightening effect that may be used when compositing two layers. In the formula, S represents the gray level of the source (foreground) image, D represents the gray level of the destination (background) image, and R represents the gray level of the composited image.

For example, consider the example where a lightening effect is used when compositing window 34 on background 32 in FIG. 2. In this example, background 32 is the destination (background) of the composite and window 34 is the source (foreground) of the composite. For each pixel, background 32 may have a set of gray levels (e.g., one for red, one for green, and one for blue) that are each between 0 and 1 (inclusive). For each pixel, foreground 34 may have a set of gray levels (e.g., one for red, one for green, and one for blue) that are each between 0 and 1 (inclusive). The formula of FIG. 3 may be applied for each one of the red, green, and blue grayscale values to determine the resulting color of window 34.

Consider a pixel that has, in background 32, gray levels of (0.5, 1, 0), where the first value is the red level, the second value is the green level, and the third value is the blue level. The pixel may have, in window 34, gray levels of (0.3, 0.8, 0.2). In other words, D=(0.5, 1, 0) and S=(0.3, 0.8, 0.2). The resulting composite when the formula of FIG. 3 is used is R=(0.8, 1, 0.2).

FIG. 4 is a formula for a darkening effect that may be used when compositing two layers. In the formula, S represents the gray level of the source (foreground) image, D represents the gray level of the destination (background) image, and R represents the gray level of the composited image.

For example, consider the example where a darkening effect is used when compositing window 36 on background 32 in FIG. 2. In this example, background 32 is the destination (background) of the composite and window 36 is the source (foreground) of the composite.

The formula of FIG. 4 may be applied for each one of the red, green, and blue grayscale values to determine the resulting color of window 36. Consider a pixel that has, in background 32, gray levels of (0.5, 1, 0), where the first value is the red level, the second value is the green level, and the third value is the blue level. The pixel may have, in window 36, gray levels of (0.3, 0.8, 0.2). In other words, D=(0.5, 1, 0) and S=(0.3, 0.8, 0.2). The resulting composite when the formula of FIG. 4 is used is R=(0, 0.8, 0).

Therefore, the lightening or darkening effect of FIGS. 3 and 4 may be selected to blend adjacent elements in the user interface. Different effects may be applied to different elements of the same layer of the user interface. For example, the lightening effect may be used to composite window 34 over background 32 whereas the darkening effect may be used to composite window 36 over background 32.

The lightening and darkening effects may be cumulative. In other words, as the user interface is composited from back to front, the result of a first composite is used as the background for a subsequent composite. Considering the example of FIG. 2, window 34 is composited over background 32 to form a blended layer. User interface element 38 may subsequently be composited over the blended layer. Similarly, window 36 is composited over background 32 to form a blended layer. User interface element 40 may subsequently be composited over the blended layer.

Continuing the previous example of the pixel in window 34 that is composited with a lightening effect, the resulting gray scale values (R=(0.8, 1, 0.2)) of the first composite may be used as the destination values D for the subsequent composite with user interface element 38.

Continuing the previous example of the pixel in window 36 that is composited with a darkening effect, the resulting gray scale values (R=(0, 0.8, 0)) of the first composite may be used as the destination values D for the subsequent composite with user interface element 40.

The aforementioned examples of applying the darkening and/or lightening effect when compositing user interface elements is merely illustrative. In general, the darkening and/or lightening effects may be used when compositing any elements (e.g., any rendered elements may serve as the foreground and background layers for the compositing process).

Figure 5:
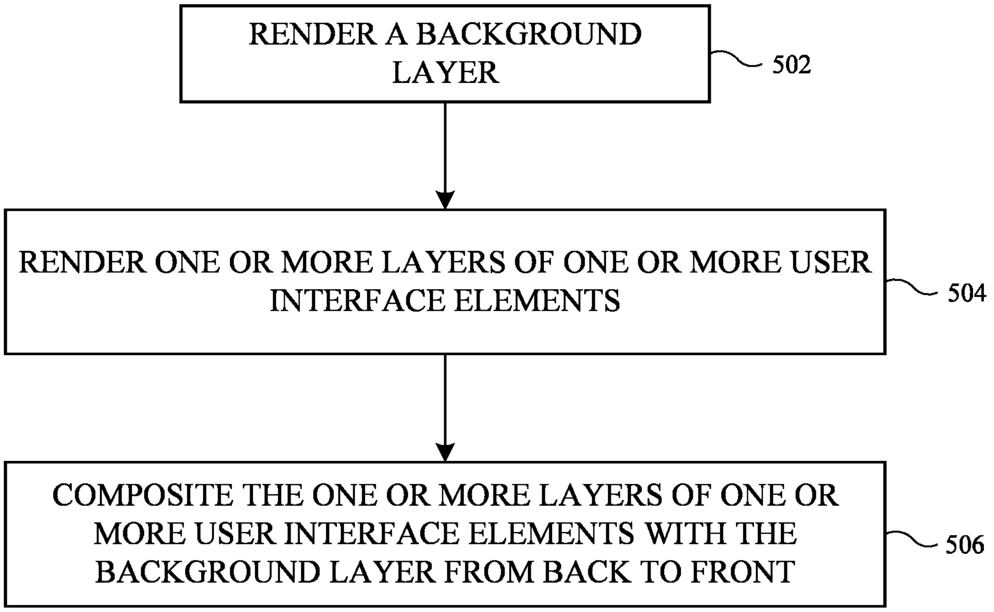
FIG. 5 is a flowchart of illustrative method steps for rendering and displaying elements over a background in accordance with some embodiments.

FIG. 5 is a flowchart of illustrative operations for displaying a user interface over a background. During the operations of block 502, control circuitry 16 may render a background layer for the display. Next, during the operations of block 504, the control circuitry may render one or more layers of one or more user interface elements. Finally, during the operations of block 506, the control circuitry may composite the one or more layers of one or more user interface elements with the background layer from back to front. In other words, a bottom-most user interface layer is composited with the background layer to form a first composite, a second-from-bottom user interface layer is composited with the first composite to form a second composite, a third-from-bottom user interface layer is composited with the second composite to form a third composite, etc.

The operations of FIG. 5 may need to be performed whenever one of the elements on the display changes. In other words, due to the interdependence of all of the layers in the compositing process, the user interface is completely redrawn whenever the background or one of the user interface elements changes in appearance (e.g., in response to user input). When the background of the display is static, the operations of FIG. 5 may be performed relatively infrequently (e.g., because the user interface does not rapidly change appearance). However, in some cases the background of the display may not be static.

One example where the background is not static is when the background is a video feed. Specifically, the background of the display may be a video feed (e.g., a pass-through video feed) from camera 18. When the background is a video feed, the operations of FIG. 5 (e.g., compositing the user interface elements over the background from back to front) may need to be performed at a high frequency (because the background is changing at least at the frame rate of the video feed). This may result in greater than desired processing requirements and power consumption requirements.

To mitigate processing requirements and power consumption while still applying lightening and/or darkening effects to a rapidly changing background layer, the lightening and/or darkening effects may be encoded in one or more elements that is composited with the background layer. Additional elements (e.g., user interface elements) may optionally be composited with the layer including the one or more elements with the effects to form a single composite (sometimes referred to as a user interface composite) that has the encoded lightening and/or darkening effects. Forming the single composite of user interface elements may be relatively processing intensive. However, these operations only need to be performed when the appearance of one of the user interface elements changes. In other words, this process may be performed relatively infrequently.

The composite of user interface elements may then be composited with a background (e.g., a video feed background) using a source-over compositing technique. When the user interface elements are composited with the video feed background, the previously encoded lightening and/or darkening effects are applied to the video feed background. Compositing the user interface element composite with the video feed may be performed frequently (e.g., every frame of the video feed or every display frame, whichever is a slower frequency) but may have low processing requirements. Using this type of technique therefore allows background-dependent lightening and/or darkening effects to be applied when displaying a user interface over a video feed without requiring excessive processing power or power consumption.

The composite of the user interface elements and the background video feed may use a source-over compositing technique. FIG. 6 is a formula for a source-over compositing technique. In FIG. 6, S.rgb represents the gray level of the source (foreground) image, D.rgb represents the gray level of the destination (background) image, S.a represents the opacity of the source image, and R.rgb represents the gray level of the resulting composited image.

An S.a value of 0 corresponds to an opacity of 0 (e.g., the foreground image is entirely transparent). In this case, R.rgb=D.rgb (e.g., when the foreground image is entirely transparent, the composite image matches the background image).

An S.a value of 1 corresponds to an opacity of 1 (e.g., the foreground image is entirely opaque). In this case, R.rgb=S.rgb (e.g., when the foreground image is entirely opaque, the composite image matches the foreground image).

If desired, a premultiplied source-over compositing technique may instead be used. FIG. 7 is a formula for a premultiplied source-over compositing technique. Similar to FIG. 6, S.rgb represents the gray level of the source (foreground) image, D.rgb represents the gray level of the destination (background) image, S.a represents the opacity of the source image, and R.rgb represents the gray level of the resulting composited image. Before performing the source-over compositing operations using the formula of FIG. 7, the foreground gray levels (S.rgb) may be multiplied by the foreground opacity value (S.a) between 0 and 1. Alternatively, however, when lightening and/or darkening effects are used, the foreground opacity value in FIG. 7 is set to 0 while S.rgb includes at least one non-zero gray level. In other words, the lightening and/or darkening effects are encoded using the opacity value and color values for the foreground element.

FIG. 8 shows a formula that may be used to determine an opacity value R.a for a source-over composite (either with or without premultiplication). S.a represents the opacity of the source image, D.a represents the opacity of the destination (background) image, and R.a represents the opacity of the composited image.

To encode a lightening effect into a user interface element (that is later applied when the user interface element is composited with the background), the premutliplied source-over blend of FIG. 7 may be used. In particular, the user interface element may be assigned an opacity of 0 (e.g., S.a=0 in FIG. 7). In the formula of FIG. 6, an opacity of 0 means the contribution of the source gray levels is 0 (e.g., S.rgb effectively=0). To encode the lightening effect, the opacity may be equal to 0 while at least one source image gray level (S.rgb) is kept greater than 0 in FIG. 7.

Consider an example where a user interface element has an opacity (S.a) set equal to 0 and gray levels of (0.1, 0.1, 0.1). When the user interface element is composited with the background image, the resulting gray levels are equal to S.rgb+D.rgb (e.g., a blend that results in the gray levels being increased). In this way, using an opacity of 0 with positive, non-zero gray levels in the formula of FIG. 7 may allow for encoding of a lightening effect in the user interface element that is applied when the user interface element is composited with a background image. Importantly, only a simple operation (e.g., the formula of FIG. 7) is required to composite with the background image. This reduces processing requirements, allowing for the lightening effect to be used even when the background image is a video feed.

To encode a darkening effect into a user interface element (that is later applied when the user interface element is composited with the background), the premutliplied source-over blend of FIG. 7 may be used. To encode the darkening effect, the opacity may be equal to 0 while at least one source image gray level (S.rgb) is kept less than 0.

Consider an example where a user interface element has an opacity (S.a) set equal to 0 and gray levels of (−0.1, −0.1, −0.1). When the user interface element is composited with the background image, the resulting gray levels are equal to S.rgb+D.rgb (e.g., an additive blend that results in the gray levels being decreased due to the negative gray levels). In this way, using an opacity of 0 with negative, non-zero gray levels in the formula of FIG. 7 may allow for encoding of a darkening effect in the user interface element that is applied when the user interface element is composited with a background image. Importantly, only a simple operation (e.g., the formula of FIG. 7) is required to composite with the background image. This reduces processing requirements, allowing for the darkening effect to be used even when the background image is a video feed.

Figure 9:
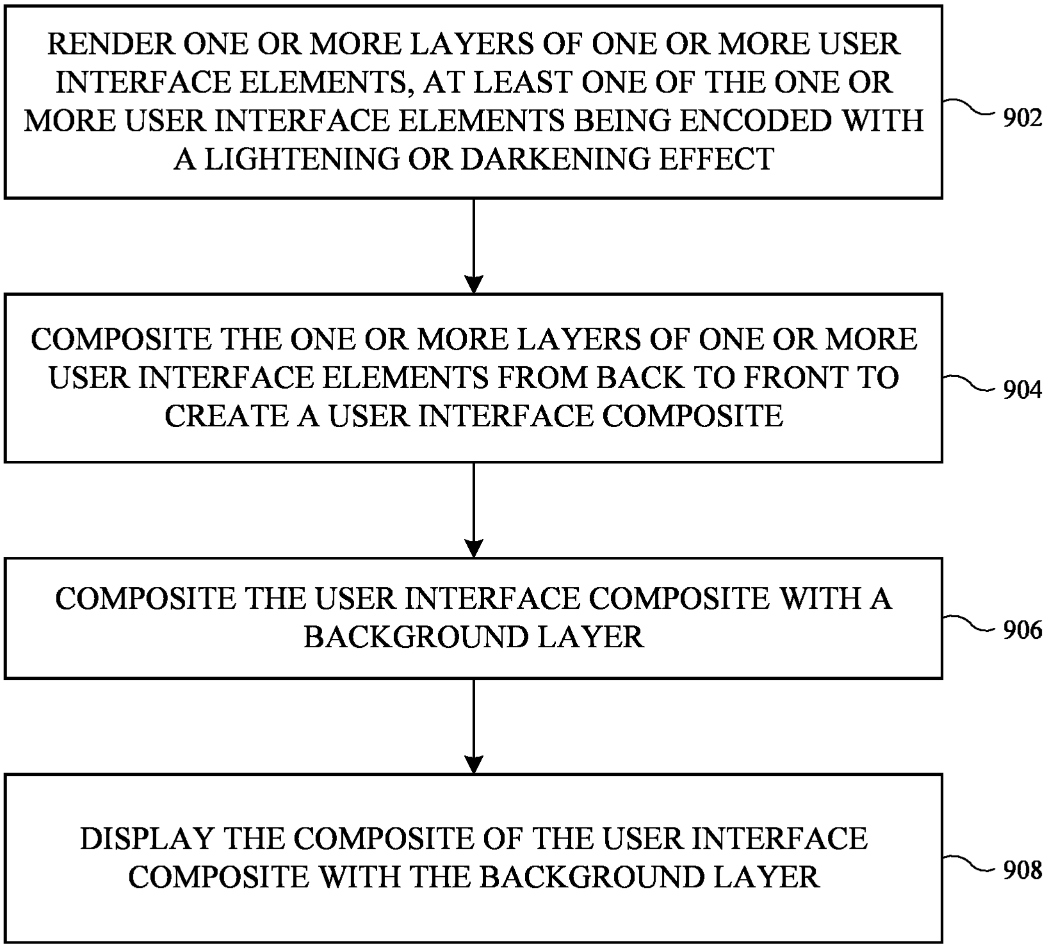
FIG. 9 is a flowchart of illustrative method steps for rendering a user interface (in response to a change to the user interface) and compositing the user interface with a background (every display frame) in accordance with some embodiments.

FIG. 9 is a flowchart of illustrative operations for displaying a user interface over a background. During the operations of block 902, control circuitry 16 may render one or more layers of one or more elements (e.g., user interface elements). At least one of the one or more user interface elements may be encoded with a lightening or darkening effect. The opacity value and color values may be used to encode the effect in an element. To encode a user interface element with the lightening or darkening effect, the user interface element may be assigned an opacity of 0 and at least one non-zero gray level (e.g., one or more positive gray levels for a lightening effect and one or more negative gray levels for a darkening effect).

The user interface elements encoded with lightening or darkening effects may be, for example, included in the back-most layer of the user interface. Next, during the operations of block 904, the one or more user interface elements may be composited from back to front to create a user interface composite. The lightening formula of FIG. 3 and/or the darkening formula of FIG. 4 may be used to composite different layers of the user interface elements with lightening and/or darkening effects.

If desired, one layer may be rendered during the operations of block 902. At least one element in the rendered layer may have an encoded lightening and/or darkening effect.

During the operations of block 906, the control circuitry may composite the user interface composite (from block 904) with at least one additional layer (e.g., a background layer). The compositing operations of block 906 may be performed based on relative depth between the rendered layer and the at least one additional layer. In particular, the control circuitry may use the premultiplied source-over composite formula from FIG. 7 to composite the user interface composite from block 904 with the at least one additional layer when the at least one additional layer is a background layer (e.g., has a lower depth than the user interface composite). When the premultiplied source-over composite is performed during the operations of block 906, the encoded lightening or darkening effect from the operations of block 902 may be applied to the at least one additional layer.

In the aforementioned example where one layer is rendered during the operations of block 902, the rendered layer from block 902 may be composited with at least one additional layer during the operations of block 906. The compositing operations of block 906 may be performed based on relative depth between the rendered layer and the at least one additional layer. In particular, the control circuitry may use the premultiplied source-over composite formula from FIG. 7 to composite the rendered layer from block 902 with the at least one additional layer when the at least one additional layer is a background layer (e.g., has a lower depth than the rendered layer). When the premultiplied source-over composite is performed during the operations of block 906, the encoded lightening or darkening effect from the operations of block 902 may be applied to the at least one additional layer.

Finally, during the operations of block 908, the composite from block 906 may be displayed (e.g., on display 14).

The operations of blocks 902 and 904 may be performed every time the user interface changes in appearance (e.g., in response to user input using one or more input-output devices 12). This may be irregular and relatively infrequent (e.g., one second may pass between consecutive changes, ten seconds may pass between consecutive changes, etc.). The operations of blocks 906 and 908 may be performed repeatedly and more frequently. For example, when the background layer is a video feed, the operations of blocks 906 and 908 may be performed for every frame of the video feed and/or every frame of the display. The operations of block 906 and 908 may be performed at a frequency that is equal to the lower of the frame rate for the display and the frame rate for the video feed. In an example where the frame rate of the display is higher than the frame rate of the video feed, the operations of blocks 906 and 908 are performed at a frequency that is equal to the frame rate of the video feed. In an example where the frame rate of the display is lower than the frame rate of the video feed, the operations of blocks 906 and 908 are performed at a frequency that is equal to the frame rate of the display.

The operations of blocks 906 and 908 may be performed at a frequency that is greater than 1 Hz, greater than 20 Hz, greater than 50 Hz, greater than 100 Hz, etc. The operations of blocks 902 and 904 may be performed irregularly, but generally less frequently than the operations of blocks 906 and 908.

The operations of blocks 902 and 904 are therefore processing-heavy but relatively infrequent whereas the operations of blocks 906 and 908 are frequent but relatively light on processing requirements. This type of scheme for displaying a user interface therefore allows for lightening and darkening effects to be applied to a background without consuming excessive amounts of power and processing resources.

The example herein of representing gray levels between 0 and 1 is merely illustrative. In general, the gray levels may be represented using other desired schemes (e.g., 0 to 255).

Additionally, it is noted that the gray levels may be stored in an extended range pixel format (e.g., with 10 bits per channel). Using this type of format, the gray levels may have a possible range of −0.5 to 1.6 (as an example). In other words, using the extended range pixel format may allow the storing of negative gray levels (which is used to encode darkening effects as previously discussed).

Although the method of FIG. 9 may be particularly useful at mitigating power consumption when the display has a non-static background (such as a video feed), the method of FIG. 9 may also be used when the display has a static background if desired.

The foregoing is merely illustrative and various modifications can be made by those skilled in the art without departing from the scope and spirit of the described embodiments. The foregoing embodiments may be implemented individually or in any combination.

What is claimed is:

1. A method of operating a display, comprising:

rendering one or more layers of one or more elements, wherein a first element in the one or more elements is encoded with a lightening or darkening effect;

compositing the one or more layers of one or more elements to create a first composite;

compositing the first composite with a background layer to create a second composite, wherein compositing the first composite with the background layer comprises applying the lightening or darkening effect of the first element to the background layer to blend the colors of the first composite and the background layer; and displaying the second composite on the display.

2. The method defined in claim 1, wherein the one or more elements are one or more user interface elements, wherein the first element is a first user interface element, and wherein the first composite is a user interface composite.

3. The method defined in claim 2, wherein rendering the one or more layers of one or more user interface elements comprises rendering the one or more layers of one or more user interface elements in response to a change to a user interface including the one or more user interface elements and wherein compositing the one or more layers of one or more user interface elements to create the user interface composite comprises compositing the one or more layers of one or more user interface elements to create the user interface composite in response to the change to the user interface including the one or more user interface elements.

4. The method defined in claim 3, wherein compositing the user interface composite with the background layer comprises repeatedly compositing the user interface composite with the background layer at a frequency.

5. The method defined in claim 4, wherein the frequency is equal to a frame rate for the display.

6. The method defined in claim 4, wherein the background layer comprises a video feed and wherein the frequency is equal to a frame rate for the video feed.

7. The method defined in claim 1, wherein compositing the one or more layers of one or more elements comprises compositing the one or more layers of one or more elements from back to front.

8. The method defined in claim 1, wherein the first element is encoded with an opacity of 0 and at least one non-zero gray level.

9. The method defined in claim 8, wherein the at least one non-zero gray level comprises a positive gray level and wherein the first element is encoded with the lightening effect.

10. The method defined in claim 8, wherein the at least one non-zero gray level comprises a negative gray level and wherein the first element is encoded with the darkening effect.

11. The method defined in claim 1, wherein compositing the first composite with the background layer comprises compositing the first composite with the background layer using a premultiplied source-over composite.

12. The method defined in claim 1, wherein the background layer comprises a video feed.

13. A method of operating a display, comprising:

rendering a layer for the display that includes an element that is encoded with a darkening effect having an opacity of 0 and a negative gray level; and compositing the rendered layer with at least one additional layer, wherein compositing the rendered layer with the at least one additional layer comprises applying the opacity and the negative gray level of the darkening effect to the at least one additional layer based on a relative depth between the rendered layer and the at least one additional layer.

14. The method defined in claim 13, wherein the at least one additional layer comprises a background layer, wherein the rendered layer is a user interface layer, and wherein the element is a user interface element.

15. The method defined in claim 14, wherein rendering the user interface layer comprises rendering the user interface layer in response to a change to the user interface layer and wherein compositing the rendered layer with the at least one additional layer comprises repeatedly compositing the rendered layer with the at least one additional layer at a frequency.

16. The method defined in claim 15, wherein the frequency is equal to a frame rate for the display.

17. The method defined in claim 15, wherein the at least one additional layer comprises a video feed and wherein the frequency is equal to a frame rate for the video feed.

18. A method of operating a display, the method comprising:

in response to a change to a user interface, at a first frequency:

rendering one or more layers of one or more user interface elements for the user interface; and compositing the one or more layers of one or more user interface elements to form a first composite; and repeatedly, at a second frequency that is different from the first frequency and is greater than 1 Hz:

compositing the first composite with a background layer to form a second composite; and displaying the second composite.

19. The method defined in claim 18, wherein the background layer comprises a video feed.

20. The method defined in claim 18, wherein the one or more user interface elements comprises a user interface element that is encoded with a lightening or darkening effect and wherein compositing the first composite with the background layer to form the second composite causes the lightening or darkening effect to be applied to the background layer.

21. The method defined in claim 1, wherein applying the lightening or darkening effect of the first element to the background layer comprises adding the gray levels of the first element to the gray levels of the background layer.

* * * * *